United States Patent [19]

Hill

[11] Patent Number: 4,617,905
[45] Date of Patent: Oct. 21, 1986

[54] ELECTRONIC IGNITION SYSTEM FOR AN INTERNAL COMBUSTION ENGINE

[75] Inventor: William F. Hill, Stafford, England

[73] Assignee: Lucas Electrical Electronics and Systems Ltd., Birmingham, England

[21] Appl. No.: 713,605

[22] Filed: Mar. 19, 1985

[30] Foreign Application Priority Data

Mar. 28, 1984 [GB] United Kingdom ............... 8408029
Dec. 14, 1984 [GB] United Kingdom ............... 8431630

[51] Int. Cl.$^4$ ............................................. F02P 1/00
[52] U.S. Cl. .................................. 123/614; 123/618; 123/644
[58] Field of Search ............... 123/614, 617, 618, 644

[56] References Cited

U.S. PATENT DOCUMENTS

| | | | |
|---|---|---|---|
| 3,937,193 | 2/1976 | Kim | 123/614 |
| 4,114,582 | 9/1978 | Rabus | 123/644 |
| 4,153,032 | 5/1979 | Chateau | 123/644 |
| 4,253,442 | 3/1981 | Jundt | 123/618 |
| 4,308,848 | 1/1982 | Pfaff | 123/618 |
| 4,347,827 | 9/1982 | LoCascio | 123/614 |
| 4,356,808 | 11/1982 | Bodig | 123/614 |
| 4,358,689 | 11/1982 | Jarrett et al. | 123/614 |
| 4,406,955 | 9/1983 | LoCascio | 123/614 |
| 4,446,843 | 5/1984 | Rumbaugh | 123/618 |
| 4,448,180 | 5/1984 | Bodig | 123/618 |
| 4,461,265 | 7/1984 | Sugiura | 123/618 |

FOREIGN PATENT DOCUMENTS 2149849A 10/1984 United Kingdom ............... 123/614

Primary Examiner—Ronald B. Cox
Attorney, Agent, or Firm—Stevens, Davis, Miller & Mosher

[57] ABSTRACT

A mechanically timed ignition system for an internal combustion engine has a variable reluctance transducer mechanically operated by the engine to produce an output waveform having zero crossings coinciding with the desired instants of sparks. A comparator means at the input of an integrated ignition control circuit is connected to a winding of the transducer. The i.c. output point, which controls a semiconductor switch connecting an ignition coil across a supply, is connected by a C-R feedback path to the input of the comparator means, to provide transient positive feedback, which is effective at cranking speed to provide improved rejection of low level audio frequency interference signals.

3 Claims, 3 Drawing Figures 4,617,905

ELECTRONIC IGNITION SYSTEM FOR AN INTERNAL COMBUSTION ENGINEW

BACKGROUND OF THE INVENTION

This invention relates to a mechanically timed electronic ignition system for an internal combustion engine.

French Patent Application No. 8017811 of Aug. 13, 1980 discloses a ignition system of the kind in which there is used a variable reluctance transducer of known type which is mechanically operated so as to produce an output waveform having zero crossings coinciding with the desired instants of ignition sparks. A winding of the transducer is connected by a passive circuit to a voltage comparator means which form a part of an integrated circuit. At cranking speeds (i.e. during engine starting) the output of the winding is compared with a fixed threshold and the output of the comparator means is used to determine both the commencement and termination of current flow in an ignition coil controlled by the integrated circuit.

At cranking speeds, however, the amplitude of the transducer waveform is not much greater than the threshold voltage and, although various anti-interference provisions are made within the integrated circuit, there can still be problems caused by audio-frequency disturbances of small amplitude resulting from mechanical vibration or from magnetic field pulsations caused by the starter motor. These disturbances can be of sufficient amplitude to cause spurious early sparks, resulting in abrupt stalling of the engine due to reverse torque, which may in turn lead to starter motor damage or merely make starting extremely difficult.

SUMMARY OF THE INVENTION

It is an object of the invention to provide an ignition system of the above mentioned kind in which this problem is avoided.

In accordance with the invention the control circuit is provided with an RC feedback path from an output point which rises by a substantially constant voltage whenever the coil current is switched on to an input of the comparator means, so as to provide transient positive feedback when the coil current is commenced to reinforce the input to the comparator means from the transducer.

With such an arrangement, the coil turn off instant is delayed to an instant at which the combined signals from the transducer and from the transient feedback path fall below the threshold voltage, which has the advantageous effect of compensating for the advance of the instant of threshold crossing of the signal from the transducer along at cranking speeds.

More particularly the invention is concerned with the known kind of system in which the control circuit comprises first and second comparators, bias voltage generating means, switch means which is triggered on by the first comparator to commence coil current flow when the combination of the bias voltage generated by said bias voltage generating means and the pick-up output signal traverses a threshold value in one direction and which is triggered off by the second comparator to interrupt current flow in the coil when the pick-up output voltage traverses a threshold value in the opposite direction, said bias voltage generating means forming part of a closed loop dwell control which is operated at higher running speeds of the engine, but disabled at lower engine speeds, and a minimum coil off timer circuit operating when the switch is triggered off.

In accordance with another aspect of the present invention the control circuit includes (a) means for turning on the switch means if the output of the first comparator is already in the state to which it is driven following traversal past said reference voltage in said one direction at the expiry of the minimum coil-off timer period (b) means for preventing initiation of the timer period by the first comparator if the switch means is already on, and (c) means for preventing initiation of the timer period by the second comparator if the switch means is already off.

Preferably inhibition means are provided for preventing turning on of the switch means at the expiry of the timer period when the closed loop dwell control is disabled. Such means may operate by setting the bias voltage to a negative value at the expiry of the timer period.

BRIEF DESCRIPTION OF THE DRAWINGS

The accompanying drawings show the application of one example of the invention to an ignition system, FIG. 1 being a diagram of the system.

DETAILED DISCUSSION OF PREFERRED EMBODIMENTS

Figure 1:
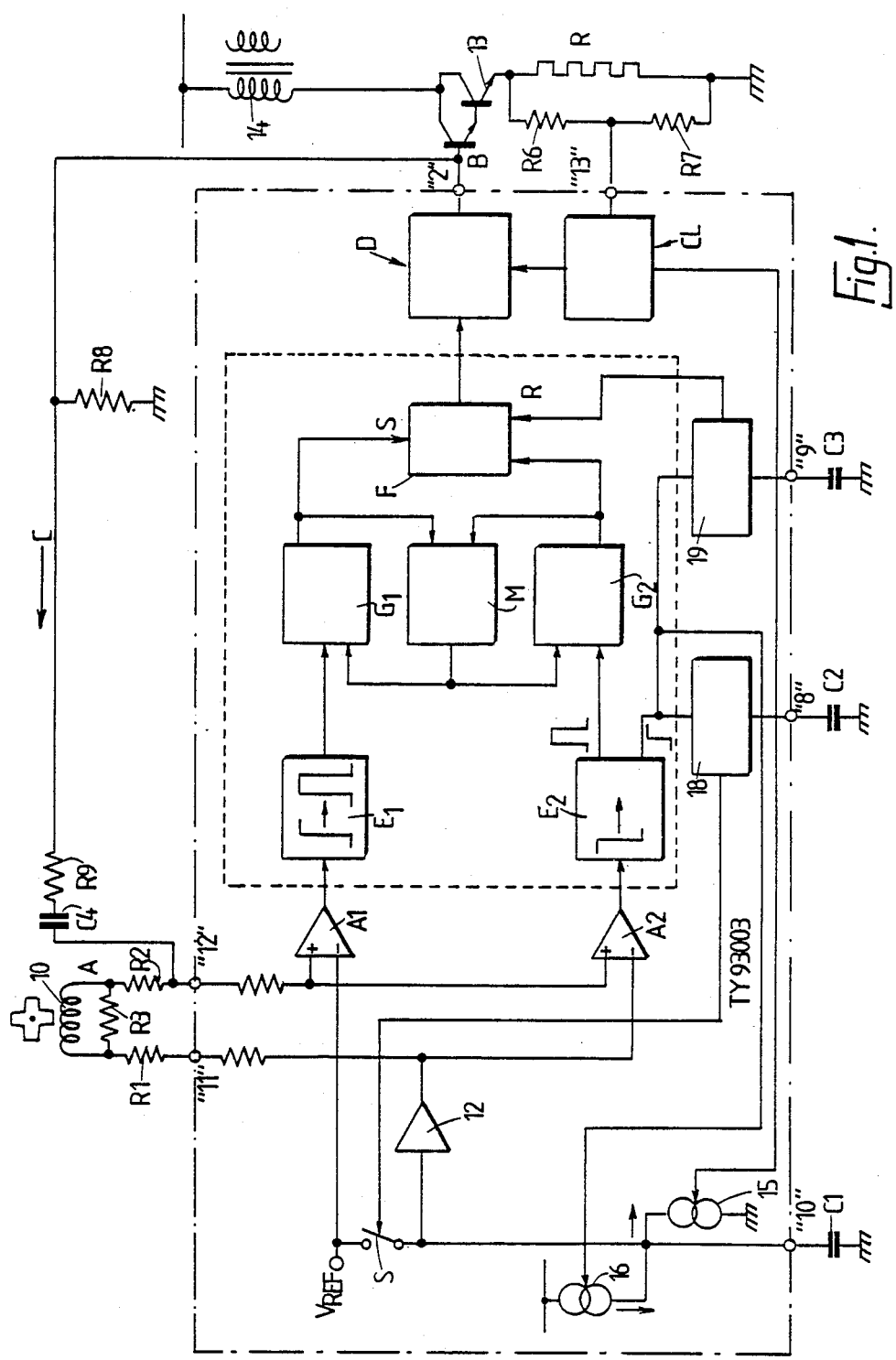
Figure 2:
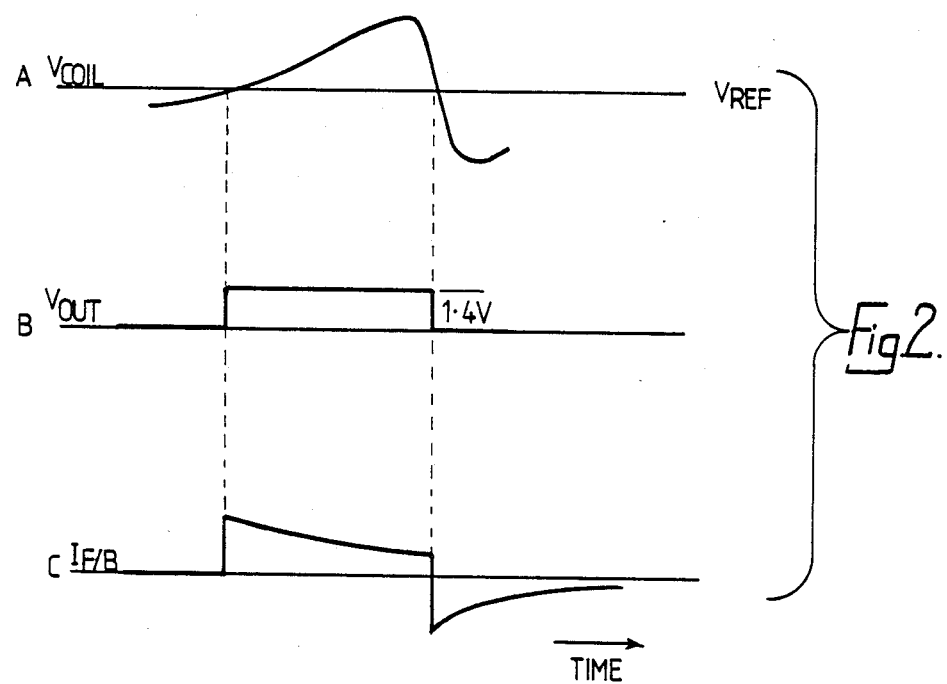
FIG. 2 being a graph showing the output waveform of the transducer, that of the control circuit, and the current waveform in a transient feedback path.

A variable reluctance pickup winding 10 has its two ends connected via two resistors $R_1$, $R_2$ to two terminals "11", "12" of an integrated circuit 11, a load resistor $R_3$ being connected across the winding 10. Within the i.c. 11 the terminal "12" is connected by a resistor $R_4$ to the non-inverting inputs of two voltage comparators $A_1$ and $A_2$. The inverting input of comparator $A_1$ is connected to a reference voltage source $V_{REF}$ and the inverting input of comparator $A_2$ is connected to the terminal "11" via a resistor $R_5$. A voltage follower 12 has its output connected to the inverting input of comparator $A_2$. The input of the voltage follower 12 is connected to a terminal "10" of the i.c. 11, which terminal is connected by a capacitor $C_1$ to ground. A switch S connects the input of voltage follower 12 to the reference voltage source $V_{REF}$, such that when the switch S is conductive the voltage at the output of voltage follower 12 is the same as the voltage $V_{REF}$, whereas when switch S is non-conductive, the output voltage of voltage follower $V_{REF}$ corresponds to the voltage on capacitor $C_1$. Voltage follower 12 applies a bias to the inverting input of comparator $A_2$ and also determines the voltage at one end of the winding 10.

Comparator $A_1$ has its output connected to an edge detector $E_1$ which produces a short positive going pulse for each positive-going edge in the output waveform of comparator $A_1$. A similar edge detector $E_2$ is connected to provide a short positive-going pulse for each negative-going edge in the output waveform of comparator $A_2$. The outputs of these edge detectors $E_1$ and $E_2$ are connected via respective gates $G_1$ and $G_2$ to the respective S and R terminals of a flip-flop circuit F. A delay monstable M connected to the output terminals of both gates $G_1$ and $G_2$ is connected to provide a blocking input to both of these gates for a fixed period after either gate has passed a signal from the associated one of the edge detectors $E_1$ or $E_2$. This delay monostable M and the gates $G_1$ $G_2$ ensure that a predetermined minimum time must pass between setting or resetting signals to the flip-flop F from the edge detectors $E_1$, $E_2$. The output of the flip-flop F is connected to a drive circuit D which provides at terminals "2" of the i.c. an output current to drive a separate Darlington pair 13 in series with the coil primary 14 current sensing resistor R. A pair of resistors $R_6$, $R_7$ is connected across resistor R. A coil current signal is picked up from the common point of these resistors and is fed back to terminal "13" of the i.c. to a current limit circuit CL which acts on the drive circuit D to reduce the output current when the coil current reaches a set level so as to maintain the coil current as this set level. The current limit circuit CL also has a logic output which controls a switchable current sink 15 for discharging capacitor $C_1$. An output taken from edge detector $E_2$ controls a switchable current source 16 for charging capacitor $C_1$. The current source 16 and sink 15 are designed to maintain the voltage on capacitor $C_1$ constant if the time for which current limit operation is taking place is a predetermined proportion of the time for which the output of comparator $A_2$ is high. If current limit operation endures for too short a time the voltage on capacitor $C_1$ rises and if it endures for too long a time this voltage falls. For normal speed operation this has the effect of changing the instant in the cycle at which the output of comparator $A_1$ goes high to correct the shortfall or excess. A speed detector 18 is controlled by the output of the comparator $A_2$ (via the edge detector $E_2$) and operates the switch S if the time for which the output of comparator $A_2$ is low exceeds a predetermined time. This condition normally arises at speeds less than the engine idling speed, i.e. during cranking. A similar circuit 19 with a much longer predetermined time interval can reset the flip-flop F if the engine stops with the flip-flop F in 'set' condition. Capacitors $C_2$ and $C_3$ connecting terminals "8" and "9" of the i.c. to ground perform these two latter timing functions in association with two current sources (not shown) provided within the i.c.

A resistor $R_8$ connects the pin "2" to ground and a transient positive feedback path is provided between pin "2" and pin "12", such path being provided by a resistor $R_9$ and a capacitor $C_4$ in series.

Thus it will be seen that whenever the output of the winding 10 rises above the fixed reference voltage $V_{REF}$ and the drive circuit D is operated, the rise in voltage at the output terminal "2" will cause current to be fed back to the input terminal "12", augmenting the current flow from the winding for a time. Similarly, when the output of the winding 10 becomes sufficiently negative to switch comparator $A_2$ and drive circuit D is turned off, current flows through capacitor $C_4$ and resistor $R_9$ in the opposite direction for a time.

At normal running speeds this positive feedback has little effect on the ignition system since the amplitude of the transducer winding output greatly exceeds the feedback. At cranking speed, however the amplitude of the transducer winding output is relatively small so that the positive feedback has a significant effect, that is to say, the voltage at terminal "12" is significantly increased by the feedback signal at switch-on of coil current so that any audio frequency interference signals arising during this time are swamped by the feedback and hence premature interruption of the coil current is prevented.

Furthermore, the time for which the feedback persists is long enough to ensure that feedback is still present at a significant level at the time when the output of the winding 10 changes polarity to provide a spark retarding effect. A greater retarding effect can be obtained in this way than is possible utilising the proposals of French Patent Application No. 8017811 referred to above.

The values of components $C_4$ and $R_9$ must be chosen so that the level of the feedback signal at the end of the required coil on time does not exceed the negative peak voltage produced by transducer winding 10 at any speed.

Figure 3:
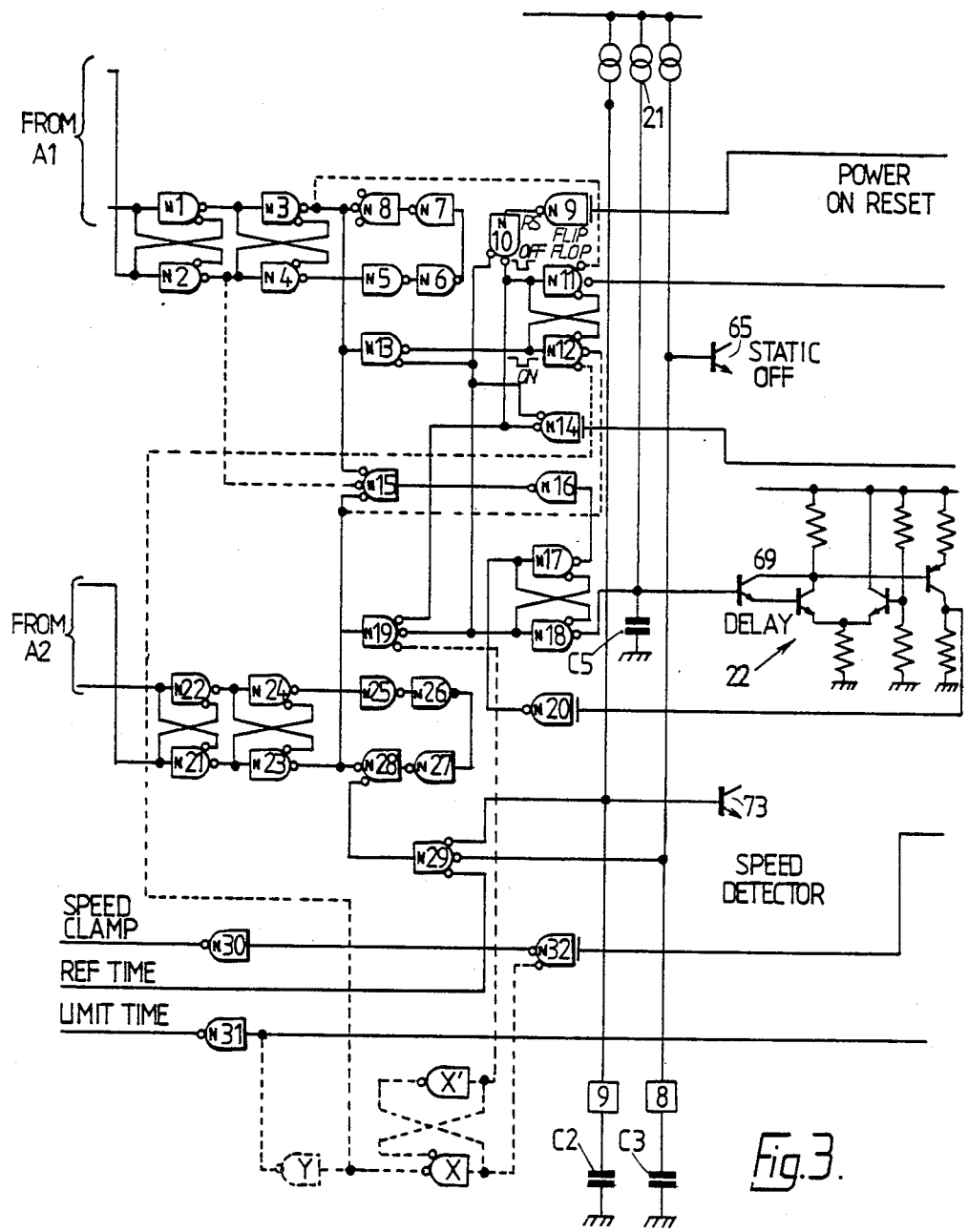
FIG. 3 being a detailed diagram of logic circuitry included in the control circuit.

Turning now to FIG. 3, there is shown therein a detailed circuit diagram of the part of the i.c. 11 enclosed within a broken line 20 in FIG. 1. In this diagram solid lines show the standard circuit, whereas the broken lines show modifications made to the circuit to provide an example of the present invention.

The example shown makes use of $I^2L$ logic elements and each element shown has a single input terminal and one or more output terminals which is or are at a low level if the input is at a high level. The input terminal of any gate may be connected to an output terminal of one or more of the other gates, and if any one of these other gates has its outputs low, the outputs of the first mentioned gate will be high, otherwise the outputs of the first mentioned gate will be low.

Elements N1 to N8 in FIG. 3 form the edge detector $E_1$ of FIG. 1, the comparator $A_1$ in fact having two antiphase outputs which drive elements N1 and N2 respectively. These elements are cross connected and connected to another cross connected pair of elements N3 and N4. The remaining four elements N5 to N8 are connected in cascade between an output of element N4 and an output of element N3. The output of element N3 goes high when the output (33) of comparator $A_1$ is high, but the elements N5, N6, N7 and N8 pull the output low again after a short delay determined by the propagation delay of these elements. Elements N21 to N28 similarly constitute the edge detector $E_2$. Elements N13 and N19 constitute the gates $G_1$ and $G_2$, elements N15 to N18 and N20 together with a current source 21, an integrated capacitor $C_5$ on a circuit 22 constitute the delay monostable M.

As shown an output of each of elements N13 and N19 is connected to the input of element N18 which is cross connected with element N17. An output of element N18 is connected to hold capacitor $C_5$ discharged, but this capacitor $C_5$ charges up if either element N13 or N19 receives a high input. The circuit 22 detects when the charge on capacitor $C_5$ reaches a set level when element N20 provides a high output to element N17 to reset the flip-flop formed by elements N17 and N18.

The flip-flop circuit F is constituted by elements $N_{11}$ and $N_{12}$. Two further elements N9 and N10 ensure that this flip-flop F and the flip-flop N17, N18 are set to the proper state on power up.

The element N29 provides the signals required by speed detector 18 and the circuit 19, both of which are similar in construction to circuit 22. Element N14 receives the output of circuit 19 for resetting the flip flop N11, N12. The output signal of speed detector 18 passes through two elements N30 and N32 in cascade on its way to the switch S. The signal to switchable current source 16 is taken from an output of element N29. Finally an element N31 is provided in the connection between the current limit circuit CL and the switchable current sink 15.

Thus far described the integrated circuit is standard and has been found to have various deficiencies in different applications. Firstly there is a danger that a complete hang-up of the logic can occur if, at idling speed or slightly higher, the signal at i.c. terminal "12" remains permanently too high to switch the output of comparator $A_1$ to its low state when maximum bias is provided by the dwell control loop. This would consequently prevent the output of comparator $A_1$ switching back to high thereby preventing coil current switching on and resulting in a total and self-sustaining loss of ignition. This type of failure would be avoided by disabling the dwell control loop (i.e. making switch S conductive at idling speed or slightly higher) but this would give rise to the problem of excessive dissipation at idling speed. Alternatively the pick up could be designed to provide a large enough negative output at low speed to overcome the maximum bias, but this would give rise to difficulty in providing a large fractional dwell value at high speeds (as required for constant energy sparks).

Secondly, as noted above the resistor-capacitor ($R_9$ $C_4$) feedback circuit is connected between output terminal "2" of the i.c. and the terminal "12" thereof to supplement the pick-up signal with a positive feedback transient with a view to preventing early sparks being produced as a result of a.f. noise on the pick-up signal during cranking. When the battery voltage is too low for the coil current to reach its limit in any cycle, the bias rises during the "reference time" and this rise has the effect of reducing noise immunity.

Thirdly, there is a risk that mechanical shocks caused by play in the gear drive to the distributor mechanism (in which the pick-up is mounted) may cause small kinks in the rising part of the pick up waveform, resulting in occasional missed sparks if comparator $A_2$ output is briefly reset and comparator $A_1$ output is already set when the delay circuit M delay subsequently expires.

The modifications made to overcome these problems are as follows.

(i) a link is provided from an output of element N15 to the input of element N4. This link enables coil turn on and delay initiation by the output of comparator $A_1$ when the delay expires if the coil is already off.

(ii) a link is provided from an output of element N11 to the input of element N13. This has the effect of inhibiting delay initiation via element N13 if the coil is already on.

(iii) a link is provided from an output of element N12 to the input of element N19. This inhibits delay initiation via element N19 if the coil current is already off.

(iv) an additional flip-flop constituted by cross connected elements X and $X^1$ is provided with the input of element X connected to an output of element N32 and the input of element $X^1$ connected to an output of element N19. This flip-flop is set when the period of speed detector 18 expires and is reset by the next following coil turn-off edge from comparator $A_2$. Element X has its output connected to another element Y the output of which is connected to the input of element N31. This supplements the limit time signal if the speed detector period has expired since the last coil turn-off edge and the coil is on. A link is provided from an output of element N12 to the input of element Y to inhibit limit time supplement unless the coil current is on.

Thus, at cranking speeds, the voltage on capacitor $C_1$ is always lowered to its minimum value before coil turn-off, ensuring that the output of the comparator $A_1$ is low when the delay period subsequently expires, thereby preventing coil turn-on at this instant, which would otherwise limit spark duration during cranking and cause excessive dissipation because of the very high fractional dwell duration (almost 100%).

At very high running speeds or at normal running speeds with an abnormally low battery voltage, resulting in failure to reach the current limit level in each cycle, the voltage on capacitor $C_1$ is raised. The output of comparator $A_1$ is consequently already high at the spark instant. Coil conduction then starts immediately following expiry of the timer delay, which is acceptable under these conditions as limitation of spark duration is less important than ensuring that maximum energy has been stored in the coil for the next spark.

I claim:

1. An internal combustion engine mechanically timed electronic ignition system comprising a variable reluctance transducer driven by the engine and including a winding which produces an output waveform having zero crossings coinciding with the desired instants of ignition sparks and a control circuit including a pair of input terminals for controlling current flow in an ignition coil, circuit means for connecting said winding to said input terminals, said control circuit comprising bias voltage generating means, first and second comparators connected to said bias voltage generating means and to said circuit means such that the first comparator compares the sum of the bias voltage and the voltage at said terminals with a reference value and the second comparator compares the voltage at said terminals with a threshold value, switch means which is triggered on by the first comparator to commence coil current flow when the combination of the bias voltage generated by said bias voltage generating means and the voltage at said terminals traverses said reference value in one direction and which is triggered off by the second comparator to interrupt current flow in the coil when the voltage at said terminals traverses said threshold value in the opposite direction, said bias voltage generating means forming part of a closed loop dwell control which is operated at higher running speeds of the engine, but disabled at lower engine speeds, and a minimum coil off timer circuit operating when the switch is triggered off, with the improvement that the control circuit includes (a) means for turning on the switch means if the output of the first comparator is already in the state to which it is driven following traversal past said reference voltage in said one direction at the expiry of the minimum coil-off timer period (b) means for preventing initiation of the timer period by the first comparator if the switch means is already on, and (c) means for preventing initiation of the timer period by the second comparator if the switch means is already off.

2. An ignition system as claimed in claim 1 in which inhibition means are also provided for preventing turning on of the switch means at the expiry of the timer period when the closed loop dwell control is disabled.

3. An ignition system as claimed in claim 2 in which said inhibition means operates by setting the bias voltage to a negative value at the expiry of the timer period.

* * * * *